(12) United States Patent
Park (10) Patent No.: US 9,310,585 B2
(45) Date of Patent: Apr. 12, 2016

(54) LENS MODULE

(71) Applicant: SAMSUNG ELECTRO-MECHANICS CO., LTD., Suwon-Si (KR)

(72) Inventor: Il Yong Park, Suwon-Si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 86 days.

(21) Appl. No.: 14/216,379

(22) Filed: Mar. 17, 2014

(65) Prior Publication Data

US 2015/0185436 A1    Jul. 2, 2015

(30) Foreign Application Priority Data

Jan. 2, 2014 (KR) .................. 10-2014-0000068

(51) Int. Cl.
*G02B 9/60* (2006.01)
*G02B 13/00* (2006.01)

(52) U.S. Cl.
CPC .............. *G02B 9/60* (2013.01); *G02B 13/0045* (2013.01)

(58) Field of Classification Search
CPC .............. G02B 9/00; G02B 9/60; G02B 9/62; G02B 9/64; G02B 13/0045
USPC .......... 359/713, 714, 754–757, 763, 764, 766
See application file for complete search history.

(56) References Cited

U.S. PATENT DOCUMENTS

| 8,379,325 | B2 | 2/2013 | Tsai | |
| 8,488,255 | B2 | 7/2013 | Tsai | |
| 2007/0229984 | A1* | 10/2007 | Shinohara | 359/763 |
| 2010/0134904 | A1* | 6/2010 | Tsai | 359/764 |
| 2012/0147482 | A1* | 6/2012 | Tsai | 359/714 |
| 2013/0057973 | A1 | 3/2013 | Kubota | |
| 2013/0201568 | A1 | 8/2013 | Tsai | |
| 2013/0258499 | A1* | 10/2013 | Hashimoto | 359/714 |
| 2014/0049839 | A1 | 2/2014 | Shinohara | |
| 2014/0285907 | A1 | 9/2014 | Tang et al. | |

FOREIGN PATENT DOCUMENTS

| JP | 2007-264180 | 10/2007 |
| JP | 2013-54099 A | 3/2013 |
| TW | 201333517 A1 | 8/2013 |
| WO | WO 2013/014850 A1 | 1/2013 |

OTHER PUBLICATIONS

Korean Office Action dated May 4, 2015 issued in corresponding Korean Patent Application No. 10-2014-0000068. (7 pages in English and 7 pages in Korean).
Extended European Search Report for European Patent Application No. 14275072.8 issued on May 4, 2015, (11 pages, in English) in counterpart.
Office Action dated Nov. 27, 2014 for Korean Patent Application No. 10-2014-0000068 and its English summary provided by Applicant's foreign counsel.

* cited by examiner

*Primary Examiner* — Darryl J Collins
(74) *Attorney, Agent, or Firm* — NSIP Law (57) ABSTRACT

There is provided a lens module including: a first lens having positive refractive power; a second lens having refractive power, an image-side surface thereof being concave; a third lens having positive refractive power; a fourth lens having negative refractive power, an object-side surface thereof being convex; and a fifth lens having refractive power and having one or more inflection point formed on at least one of an object-side surface and an image-side surface thereof, wherein the first, second, third, fourth and fifth lenses are disposed in a sequential order from the first lens to the fifth lens.

25 Claims, 12 Drawing Sheets

| SURFACE | RADIUS | THICKNESS | INDEX | ABBE NUMBER |
|---|---|---|---|---|
| OBJECT | INFINITY | INFINITY | | |
| 1 | INFINITY | 0.000 | | |
| 2 | 1.3586 | 0.575 | 1.546 | 56.1 |
| 3 | 7.4180 | 0.000 | | |
| 4 | INFINITY | 0.100 | | |
| 5 | 4.5788 | 0.230 | 1.645 | 23.3 |
| 6 | 1.9201 | 0.357 | | |
| 7 | 27.3526 | 0.375 | 1.546 | 56.1 |
| 8 | −10.9315 | 0.635 | | |
| 9 | 147.6102 | 0.493 | 1.645 | 23.3 |
| 10 | 144.0317 | 0.100 | | |
| 11 | 1.4611 | 0.497 | 1.536 | 55.7 |
| 12 | 1.1087 | 0.218 | | |
| 13 | INFINITY | 0.210 | 1.518 | 64.2 |
| 14 | INFINITY | 0.590 | | |
| IMAGE | INFINITY | 0.030 | | |

FIG. 3

| EXAMPLE 1 | 2 | 3 | 5 | 6 | 7 | 8 | 9 | 10 | 11 | 12 |
|---|---|---|---|---|---|---|---|---|---|---|
| Y RADIUS | 1.359 | 7.418 | 4.579 | 1.920 | 27.353 | -10.931 | 147.610 | 144.032 | 1.461 | 1.109 |
| CONIC CONSTANT (K) | -0.022 | -3.349 | -10.969 | 0.991 | 2.000 | -26.474 | -0.303 | -1.059 | -3.297 | -0.967 |
| 4-TH ORDER COEFFICIENT (A) | -0.012 | -0.119 | -0.284 | -0.181 | -0.136 | -0.092 | 0.138 | 0.049 | -0.313 | -0.405 |
| 6-TH ORDER COEFFICIENT (B) | 0.140 | 0.136 | 0.690 | 0.223 | -0.013 | -0.103 | -0.321 | -0.145 | 0.106 | 0.247 |
| 8-TH ORDER COEFFICIENT (C) | -0.581 | 0.588 | -0.845 | 1.659 | 0.202 | 0.282 | 0.331 | 0.133 | -0.006 | -0.128 |
| 10-TH ORDER COEFFICIENT (D) | 1.440 | -2.587 | 0.509 | -8.088 | -0.379 | -0.353 | -0.241 | -0.083 | -0.004 | 0.048 |
| 12-TH ORDER COEFFICIENT (E) | -2.003 | 4.615 | 0.137 | 17.918 | 0.522 | 0.275 | 0.099 | 0.031 | 0.001 | -0.012 |
| 14-TH ORDER COEFFICIENT (F) | 1.485 | -4.031 | -0.534 | -19.890 | -0.328 | -0.075 | -0.020 | -0.006 | 0.000 | 0.002 |
| 16-TH ORDER COEFFICIENT (G) | -0.451 | 1.386 | 0.272 | 8.940 | 0.078 | -0.005 | 0.001 | 0.000 | 0.000 | 0.000 |
| 18-TH ORDER COEFFICIENT (H) | 0.000 | 0.000 | 0.000 | 0.000 | 0.000 | 0.000 | 0.000 | 0.000 | 0.000 | 0.000 |
| 20-TH ORDER COEFFICIENT (J) | 0.000 | 0.000 | 0.000 | 0.000 | 0.000 | 0.000 | 0.000 | 0.000 | 0.000 | 0.000 |

| Surface | Radius | Thickness | Index | ABBE NUMBER |
|---|---|---|---|---|
| Object | Infinity | Infinity | | |
| 1 | Infinity | 0.000 | | |
| 2 | 1.3933 | 0.575 | 1.546 | 56.1 |
| 3 | 6.4543 | 0.000 | | |
| 4 | 1.00E+18 | 0.107 | | |
| 5 | 3.9386 | 0.230 | 1.645 | 23.3 |
| 6 | 1.9136 | 0.364 | | |
| 7 | 34.4239 | 0.375 | 1.546 | 56.1 |
| 8 | −9.7204 | 0.640 | | |
| 9 | 18.2636 | 0.493 | 1.645 | 23.3 |
| 10 | 18.0645 | 0.100 | | |
| 11 | 1.4472 | 0.497 | 1.536 | 55.7 |
| 12 | 1.0944 | 0.209 | | |
| 13 | Infinity | 0.210 | 1.518 | 64.2 |
| 14 | Infinity | 0.590 | | |
| Image | Infinity | 0.030 | | |

FIG. 7

| EXAMPLE 2 | 2 | 3 | 5 | 6 | 7 | 8 | 9 | 10 | 11 | 12 |
|---|---|---|---|---|---|---|---|---|---|---|
| Y RADIUS | 1.393 | 6.454 | 3.939 | 1.914 | 34.424 | -9.720 | 18.264 | 18.064 | 1.447 | 1.094 |
| CONIC CONSTANT (K) | -0.041 | -3.349 | -10.969 | 0.740 | 2.000 | -26.474 | -0.303 | -1.059 | -3.377 | -0.967 |
| 4-TH ORDER COEFFICIENT (A) | -0.013 | -0.103 | -0.254 | -0.172 | -0.130 | -0.096 | 0.136 | 0.036 | -0.351 | -0.436 |
| 6-TH ORDER COEFFICIENT (B) | 0.156 | 0.074 | 0.603 | 0.197 | -0.056 | -0.130 | -0.313 | -0.105 | 0.161 | 0.284 |
| 8-TH ORDER COEFFICIENT (C) | -0.669 | 0.717 | -0.896 | 1.379 | 0.403 | 0.382 | 0.322 | 0.087 | -0.039 | -0.154 |
| 10-TH ORDER COEFFICIENT (D) | 1.674 | -2.777 | 1.320 | -6.591 | -0.960 | -0.556 | -0.237 | -0.055 | 0.007 | 0.059 |
| 12-TH ORDER COEFFICIENT (E) | -2.340 | 4.841 | -1.812 | 14.482 | 1.472 | 0.506 | 0.101 | 0.021 | -0.001 | -0.015 |
| 14-TH ORDER COEFFICIENT (F) | 1.736 | -4.241 | 1.486 | -16.077 | -1.096 | -0.205 | -0.021 | -0.004 | 0.000 | 0.002 |
| 16-TH ORDER COEFFICIENT (G) | -0.528 | 1.480 | -0.526 | 7.214 | 0.312 | 0.024 | 0.002 | 0.000 | 0.000 | 0.000 |
| 18-TH ORDER COEFFICIENT (H) | 0.000 | 0.000 | 0.000 | 0.000 | 0.000 | 0.000 | 0.000 | 0.000 | 0.000 | 0.000 |
| 20-TH ORDER COEFFICIENT (J) | 0.000 | 0.000 | 0.000 | 0.000 | 0.000 | 0.000 | 0.000 | 0.000 | 0.000 | 0.000 |

| Surface | Radius | Thickness | Index | ABBE NUMBER |
|---|---|---|---|---|
| Object | Infinity | Infinity | | |
| 1 | Infinity | 0.000 | | |
| 2 | 1.6243 | 0.690 | 1.546 | 56.1 |
| 3 | 9.6536 | 0.000 | | |
| 4 | 1.00E+18 | 0.112 | | |
| 5 | 5.6325 | 0.275 | 1.645 | 23.3 |
| 6 | 2.2578 | 0.447 | | |
| 7 | 35.9226 | 0.443 | 1.546 | 56.1 |
| 8 | −10.9935 | 0.829 | | |
| 9 | 26.5546 | 0.601 | 1.645 | 23.3 |
| 10 | 26.2336 | 0.115 | | |
| 11 | 1.8666 | 0.591 | 1.546 | 56.1 |
| 12 | 1.3654 | 0.260 | | |
| 13 | Infinity | 0.210 | 1.518 | 64.2 |
| 14 | Infinity | 0.661 | | |
| Image | Infinity | 0.036 | | |

FIG. 11

| EXAMPLE 3 | 2 | 3 | 5 | 6 | 7 | 8 | 9 | 10 | 11 | 12 |
|---|---|---|---|---|---|---|---|---|---|---|---|
| Y RADIUS | 1.624 | 9.654 | 5.633 | 2.258 | 35.923 | -10.993 | 26.555 | 26.234 | 1.867 | 1.365 |
| CONIC CONSTANT (K) | -0.022 | -3.349 | -10.969 | 0.994 | 2.000 | -26.474 | -0.303 | -1.059 | -3.404 | -0.967 |
| 4-TH ORDER COEFFICIENT (A) | -0.007 | -0.075 | -0.170 | -0.106 | -0.082 | -0.056 | 0.064 | 0.020 | -0.191 | -0.235 |
| 6-TH ORDER COEFFICIENT (B) | 0.066 | 0.074 | 0.283 | 0.094 | 0.025 | -0.034 | -0.104 | -0.044 | 0.055 | 0.103 |
| 8-TH ORDER COEFFICIENT (C) | -0.199 | 0.132 | -0.207 | 0.478 | -0.045 | 0.072 | 0.071 | 0.026 | -0.007 | -0.038 |
| 10-TH ORDER COEFFICIENT (D) | 0.350 | -0.465 | 0.003 | -1.660 | 0.104 | -0.070 | -0.035 | -0.011 | 0.001 | 0.010 |
| 12-TH ORDER COEFFICIENT (E) | -0.342 | 0.592 | 0.146 | 2.598 | -0.103 | 0.044 | 0.010 | 0.003 | 0.000 | -0.002 |
| 14-TH ORDER COEFFICIENT (F) | 0.178 | -0.362 | -0.130 | -2.031 | 0.057 | -0.013 | -0.001 | 0.000 | 0.000 | 0.000 |
| 16-TH ORDER COEFFICIENT (G) | -0.038 | 0.086 | 0.037 | 0.642 | -0.012 | 0.001 | 0.000 | 0.000 | 0.000 | 0.000 |
| 18-TH ORDER COEFFICIENT (H) | 0.000 | 0.000 | 0.000 | 0.000 | 0.000 | 0.000 | 0.000 | 0.000 | 0.000 | 0.000 |
| 20-TH ORDER COEFFICIENT (J) | 0.000 | 0.000 | 0.000 | 0.000 | 0.000 | 0.000 | 0.000 | 0.000 | 0.000 | 0.000 |

FIG. 12

LENS MODULE

CROSS-REFERENCE TO RELATED APPLICATION

This application claims the benefit of Korean Patent Application No. 10-2014-0000068 filed on Jan. 2, 2014, with the Korean Intellectual Property Office, the disclosure of which is incorporated herein in its entirety by reference.

BACKGROUND

The present technology generally relates to a lens module having an optical system including five lenses.

Generally, a camera for a mobile communications terminal includes a lens module and an imaging device.

Here, the lens module includes a plurality of lenses and includes an optical system including the plurality of lenses and projecting an image of a subject onto the imaging device. In addition, the imaging device may be a device such as charge coupled device (CCD), or the like, and generally has a pixel size of 1.4 µm or more.

However, in accordance with a gradual decrease in sizes of the mobile communications terminal and the camera, a pixel size of the imaging device has been decreased to 1.12 µm or less. Therefore, development of a lens module having low F No. of 2.3 or less at which high resolution images may be implemented, even under the above-mentioned conditions, has been demanded.

SUMMARY

Some embodiments of the present disclosure may provide a lens module capable of implementing high resolution images.

According to some embodiments of the present disclosure, a lens module may include: a first lens having positive refractive power; a second lens having refractive power, an image-side surface thereof being concave; a third lens having positive refractive power; a fourth lens having negative refractive power, an object-side surface thereof being convex; and a fifth lens having refractive power and having one or more inflection point formed on at least one of an object-side surface and an image-side surface thereof, wherein the first, second, third, fourth and fifth lenses are disposed in a sequential order from the first lens to the fifth lens.

The second lens may have negative refractive power.

The fifth lens may have negative refractive power.

An object-side surface of the first lens may be convex, and an image-side surface thereof may be concave.

An object-side surface of the second lens may be convex.

An object-side surface and an image-side surface of the third lens may be convex.

The object-side surface of the fifth lens may be convex, and the image-side surface thereof may be concave.

The lens module may satisfy the following Conditional Expressions:

$$0.5 < f1/f < 1.0 \quad \text{[Conditional Expressions]}$$

where f is an overall focal length of the lens module, and f1 is a focal length of the first lens.

The lens module may satisfy the following Conditional Expressions:

$$V1 - V2 > 25.0 \quad \text{[Conditional Expressions]}$$

where V1 is an abbe number of the first lens, and V2 is an abbe number of the second lens.

The lens module may satisfy the following Conditional Expressions:

$$-2.0 < f2/f < -1.0 \quad \text{[Conditional Expressions]}$$

where f is an overall focal length of the lens module, and f2 is a focal length of the second lens.

The lens module may satisfy the following Conditional Expressions:

$$0.8 < OAL/f < 1.3 \quad \text{[Conditional Expressions]}$$

where f is an overall focal length of the lens module, and OAL is a distance from an object-side surface of the first lens to an image surface.

The lens module may satisfy the following Conditional Expressions:

$$f2/f3 < -0.25 \quad \text{[Conditional Expressions]}$$

where f2 is a focal length of the second lens, and f3 is a focal length of the third lens.

The lens module may satisfy the following Conditional Expressions:

$$BFL/f > 0.2 \quad \text{[Conditional Expressions]}$$

where f is an overall focal length of the lens module, and BFL is a distance from the image-side surface of the fifth lens to an image surface.

The lens module may satisfy the following Conditional Expressions:

$$D12/f < 0.04 \quad \text{[Conditional Expressions]}$$

where f is an overall focal length of the lens module, and D12 is an air gap between the first lens and the second lens.

The lens module may satisfy the following Conditional Expressions:

$$r1/f > 0.3 \quad \text{[Conditional Expressions]}$$

where f is an overall focal length of the lens module, and r1 is a radius of curvature of an object-side surface of the first lens.

The lens module may satisfy the following Conditional Expressions:

$$r8/f > 1.5 \quad \text{[Conditional Expressions]}$$

where f is an overall focal length of the lens module, and r8 is a radius of curvature of an image-side surface of the fourth lens.

The lens module may satisfy the following Conditional Expressions:

$$(EPD/2)/f1 > 0.2 \quad \text{[Conditional Expressions]}$$

where f1 is a focal length of the first lens, and EPD (entrance pupil diameter) is a size of a stop formed at the front of the lens module.

The lens module may satisfy the following Conditional Expressions:

$$(r7 - r8)/f > 0 \quad \text{[Conditional Expressions]}$$

where f is an overall focal length of the lens module, r7 is a radius of curvature of the object-side surface of the fourth lens, and r8 is a radius of curvature of an image-side surface of the fourth lens:

An F No. may be 2.3 or less.

According to another aspect of the present disclosure, a lens module may include: a first lens having positive refractive power; a second lens having refractive power; a third lens having positive refractive power; a fourth lens having refractive power, an image-side surface thereof being concave; and a fifth lens having refractive power and having one or more inflection point formed on at least one of an object-side surface and an image-side surface thereof, wherein the lens module satisfies the following Conditional Expressions:

$$1.0 < r7/r8 < 1.6 \quad \text{[Conditional Expressions]}$$

where r7 is a radius of curvature of an object-side surface of the fourth lens, and r8 is a radius of curvature of the image-side surface of the fourth lens.

The second lens may have a negative refractive power.

The fifth lens may have negative refractive power.

An object-side surface of the first lens may be convex, and an image-side surface thereof may be concave.

An object-side surface of the second lens may be convex, and an image-side surface thereof may be concave.

An object-side surface and an image-side surface of the third lens may be convex.

The object-side surface of the fourth lens may be convex.

The object-side surface of the fifth lens may be convex, and the image-side surface thereof may be concave.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Hereinafter, embodiments of the present disclosure will be described in detail with reference to the accompanying drawings. The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art. In the drawings, the shapes and dimensions of elements may be exaggerated for clarity, and the same reference numerals will be used throughout to designate the same or like elements.

In addition, it is to be noted that in the present specification, a first lens refers to a lens closest to an object and a sixth lens refers to a lens closest to an image sensor. Further, it is to be noted that the term 'front' refers to a direction from the lens module toward an object, while the term 'rear' refers to a direction from the lens module toward an image sensor. In addition, it is to be noted that a first surface of each lens refers to a lens surface closest to the object (or an object-side surface) and a second surface of each lens refers to a lens surface closest to the image sensor (or an image-side surface). Further, in the present specification, units of all of radii of curvature, thicknesses, OAL, TTL, SL, ImgH of the lenses, an overall focal length of an optical system, and a focal length of each lens may be millimeters (mm). Further, in a description for a shape of the lens, the meaning that one surface of the lens is convex is that an optical axis portion of a corresponding surface is convex, and the meaning that one surface of the lens is concave is that an optical axis portion of a corresponding surface is concave. Therefore, although it is described that one surface of the lens is convex, an edge portion of the lens may be concave. Likewise, although it is described that one surface of the lens is concave, an edge portion of the lens may be convex. In addition, it is to be noted that thicknesses of lenses and distances between the lenses that are shown in the accompanying drawings and Tables were measured based on optical axes of the lenses.

Figure 1:
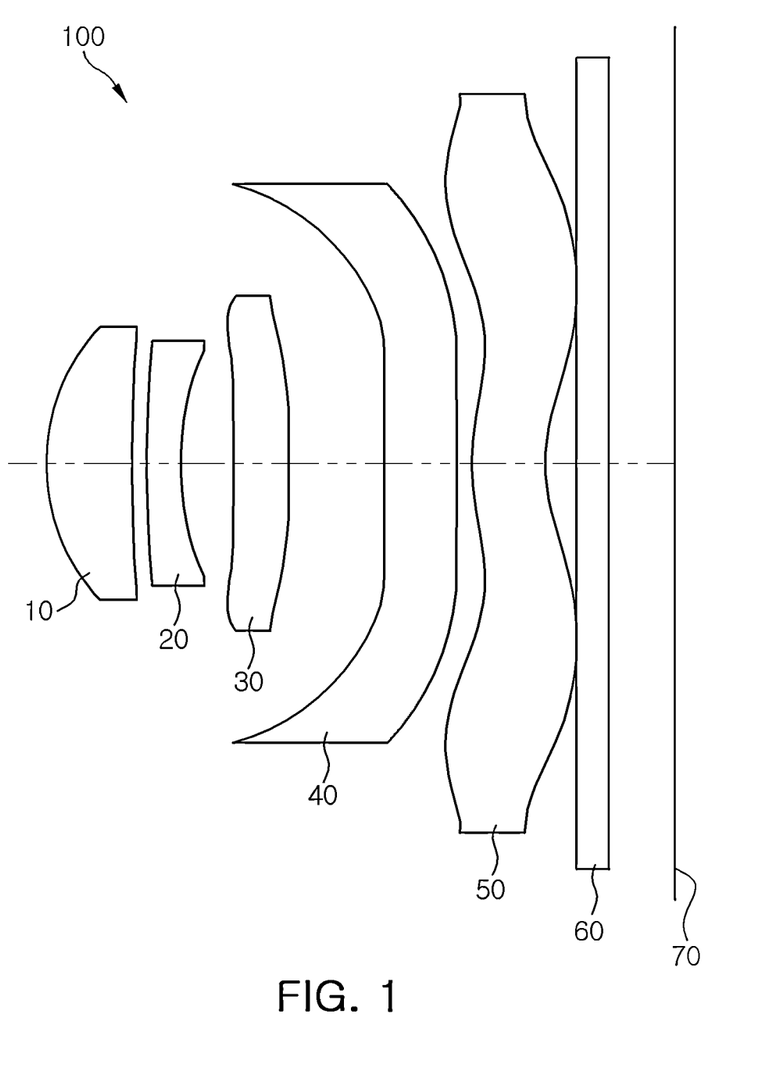
FIG. 1 is a configuration diagram of a lens module according to a first exemplary embodiment of the present disclosure.
Figure 2:
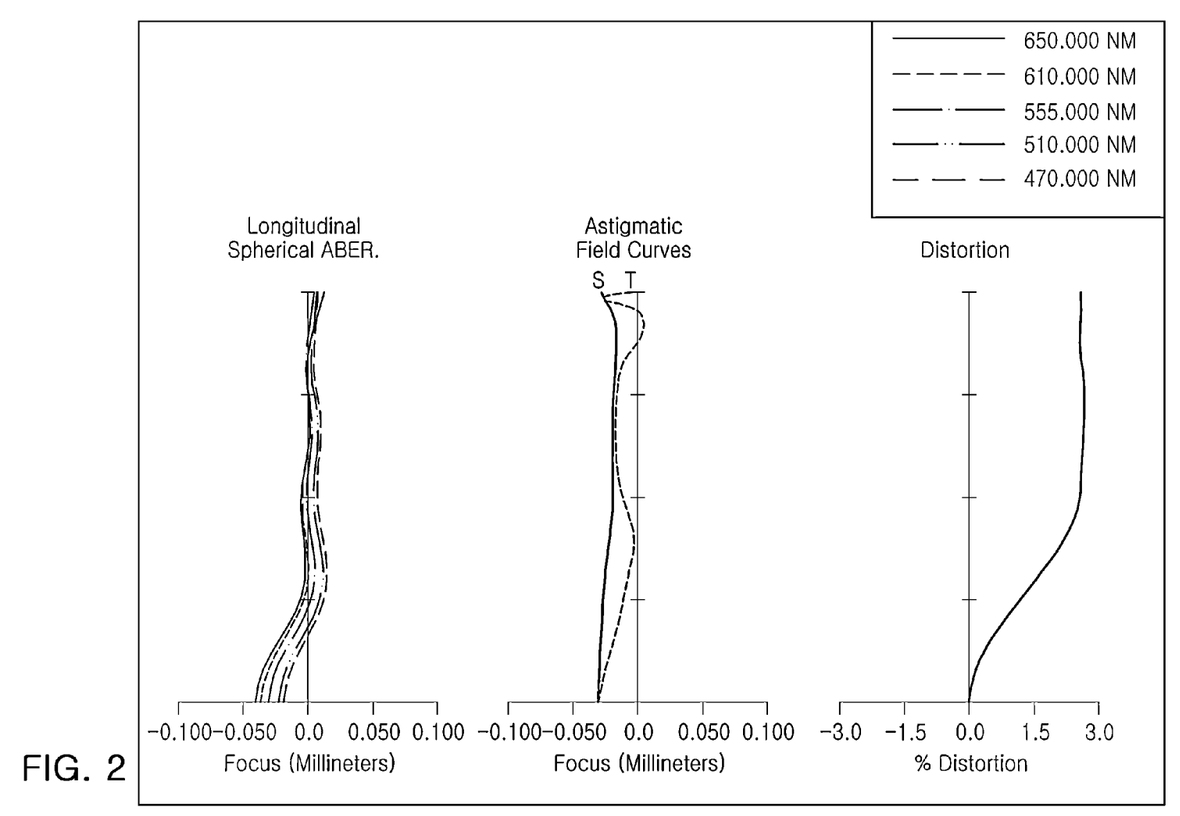
FIG. 2 is a graph displaying aberration characteristics of the lens module shown in FIG. 1.
Figure 3:
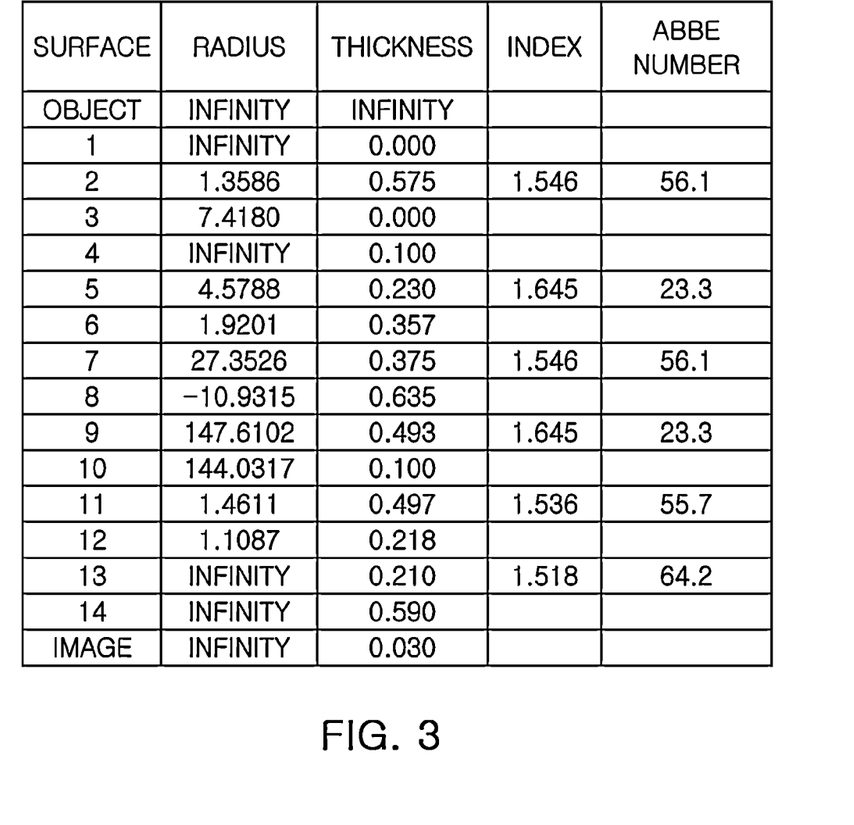
FIG. 3 is a table displaying characteristics of lenses shown in FIG. 1.
Figure 4:
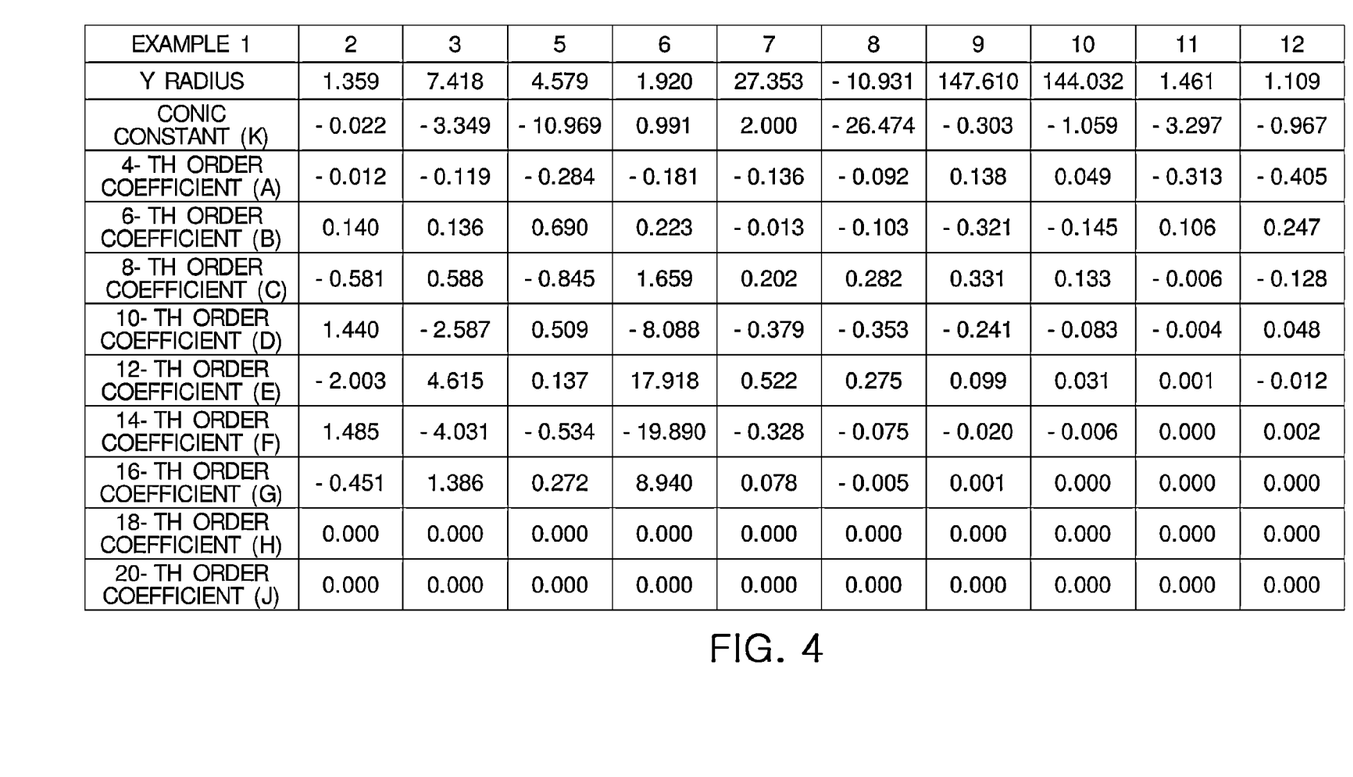
FIG. 4 is a table displaying aspherical surface coefficients of the lens module shown in FIG. 1.
Figure 5:
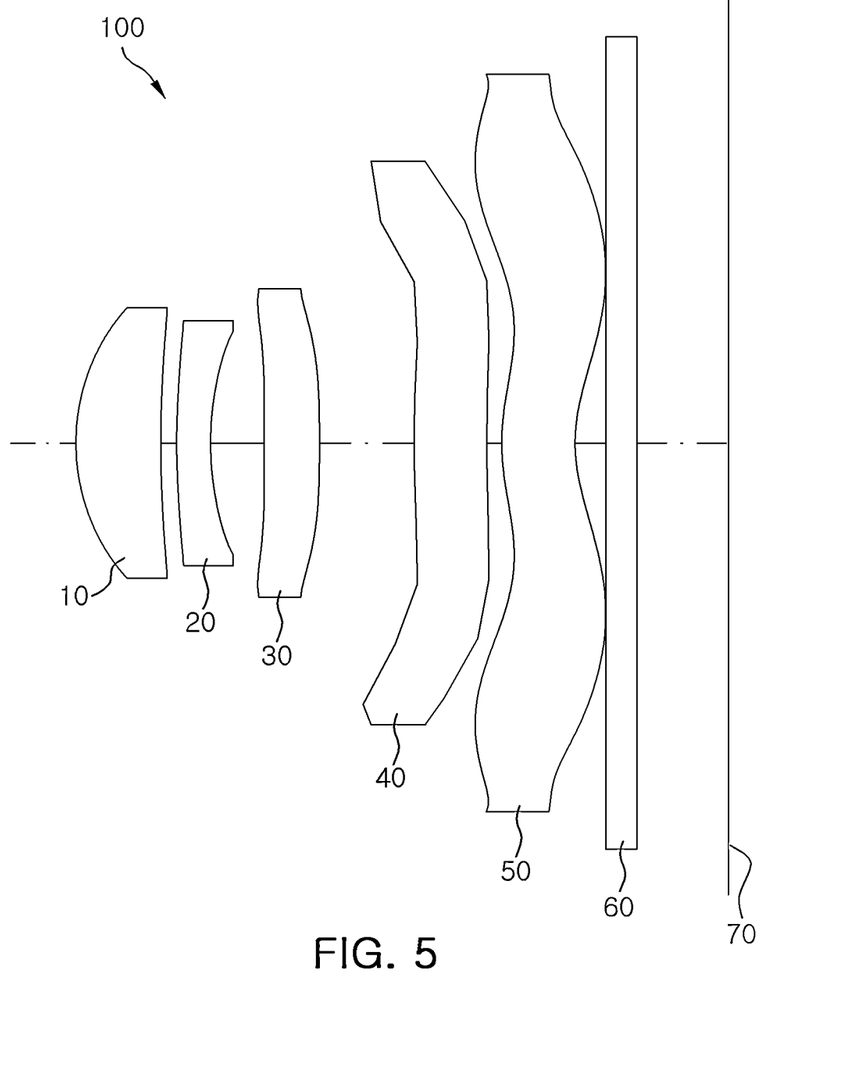
FIG. 5 is a configuration diagram of a lens module according to a second exemplary embodiment of the present disclosure.
Figure 6:
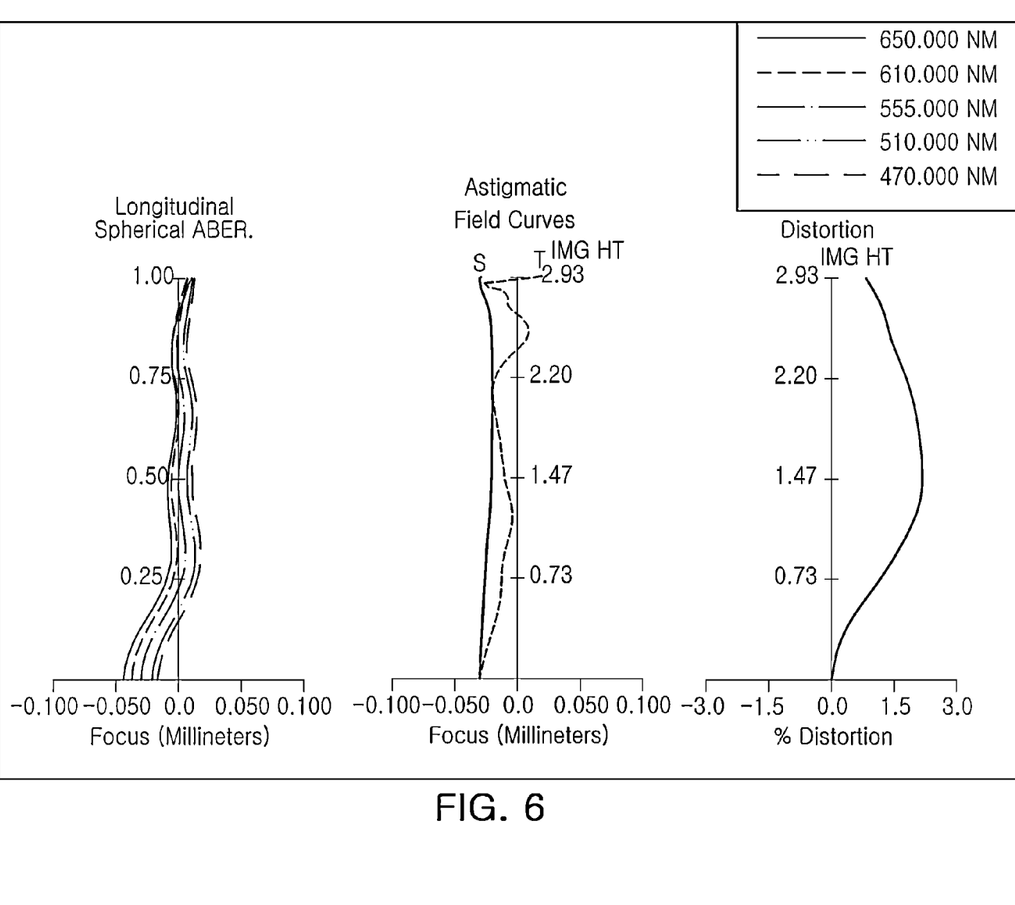
FIG. 6 is a graph displaying aberration characteristics of the lens module shown in FIG. 5.
Figure 7:
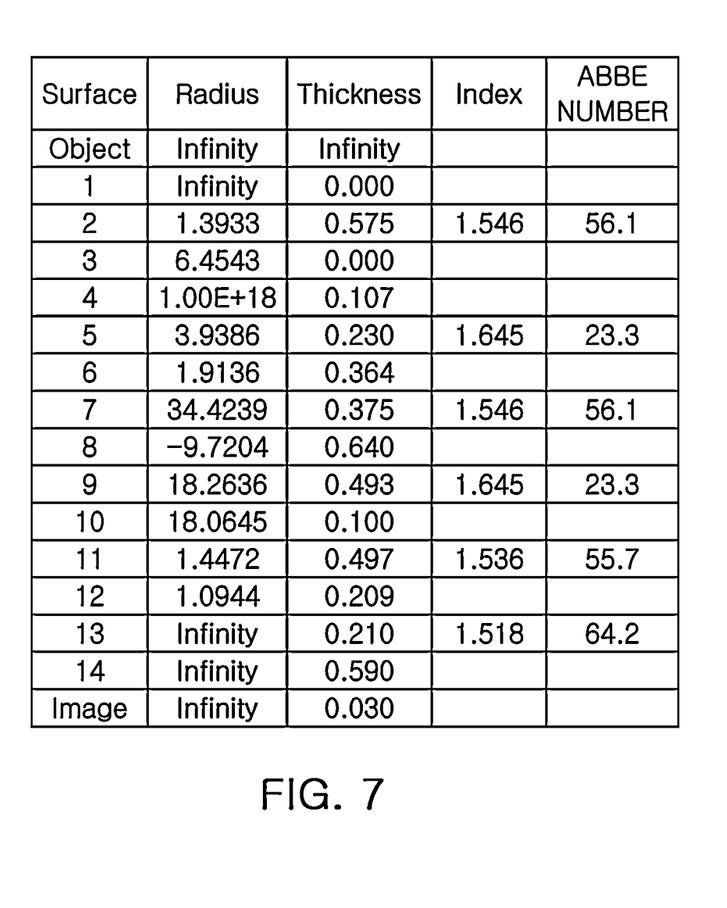
FIG. 7 is a table displaying characteristics of lenses shown in FIG. 5.
Figure 8:
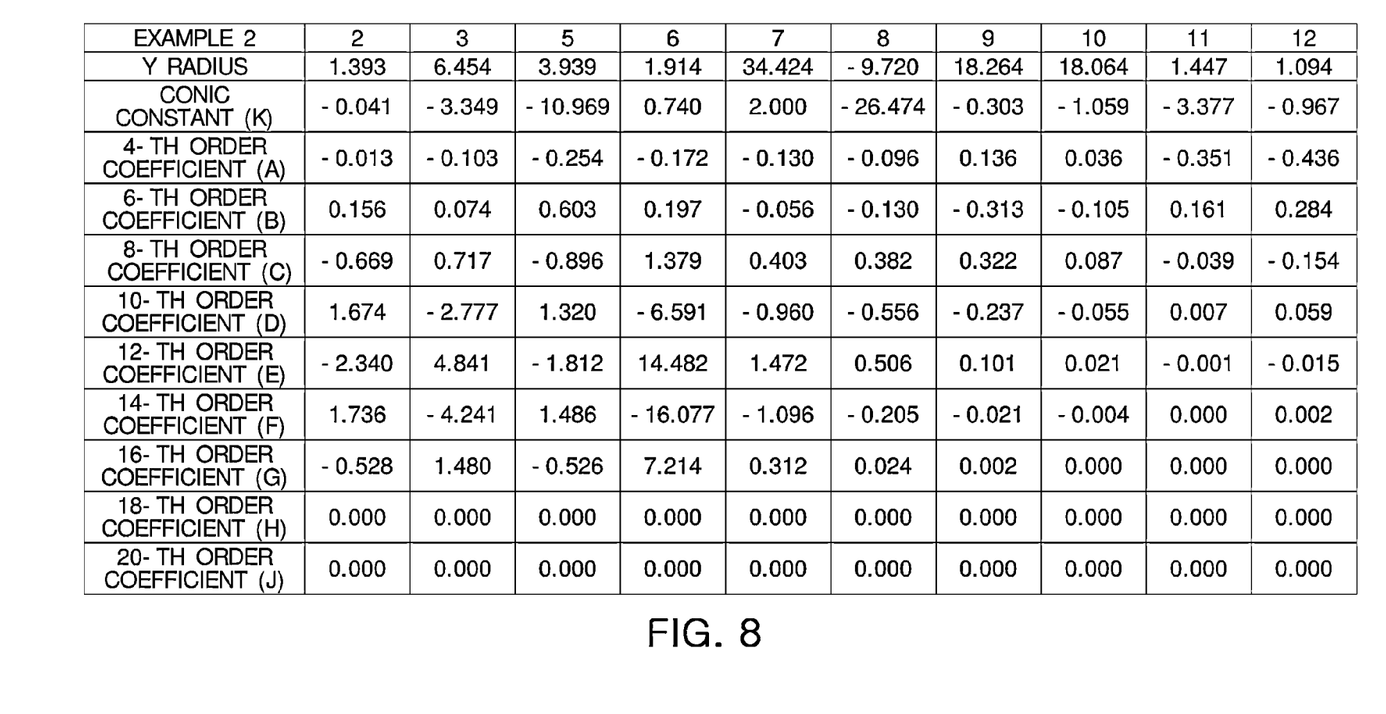
FIG. 8 is a table displaying aspherical surface coefficients of the lens module shown in FIG. 5.
Figure 9:
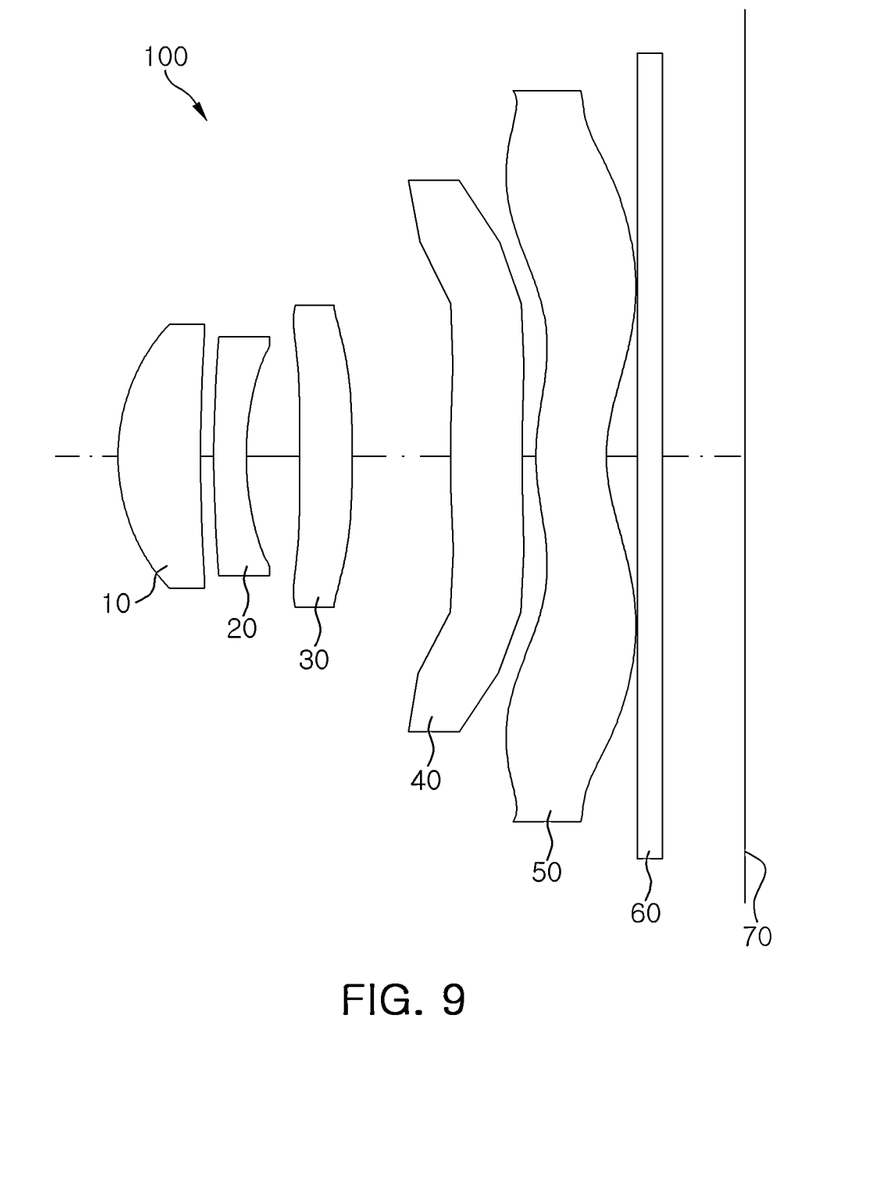
FIG. 9 is a configuration diagram of a lens module according to another exemplary embodiment of the present disclosure.
Figure 10:
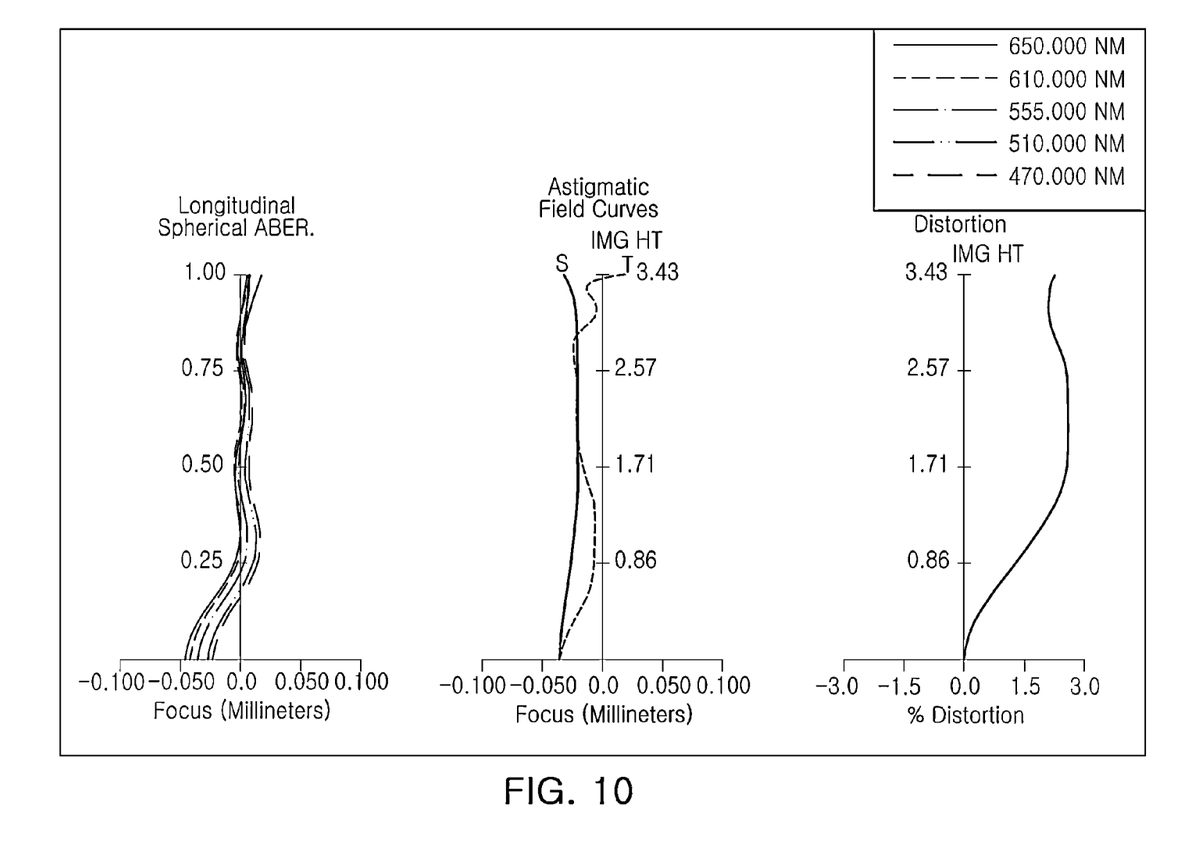
FIG. 10 is a graph displaying aberration characteristics of the lens module shown in FIG. 9.
Figure 11:
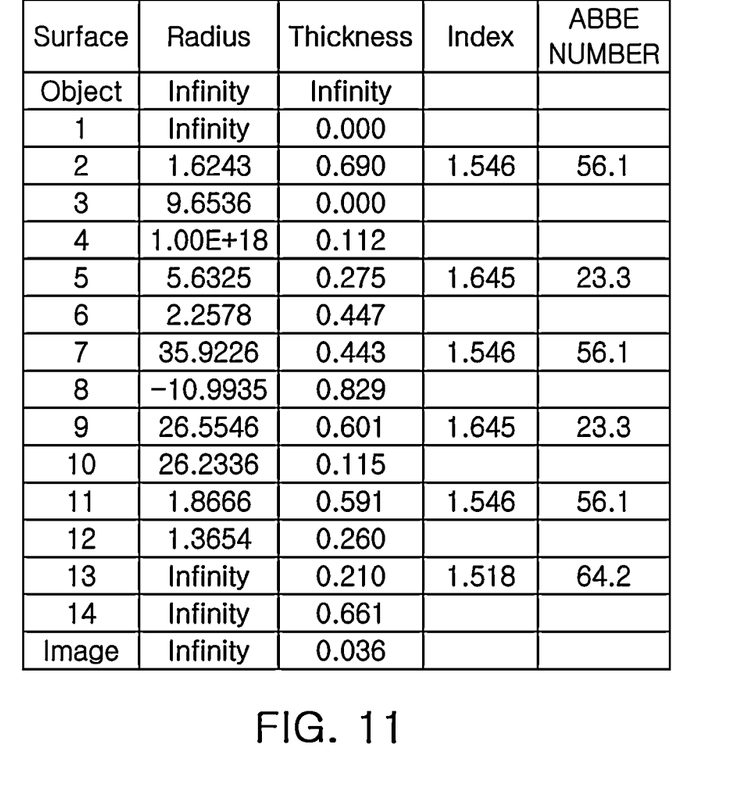
FIG. 11 is a table displaying characteristics of lenses shown in FIG. 9.
Figure 12:
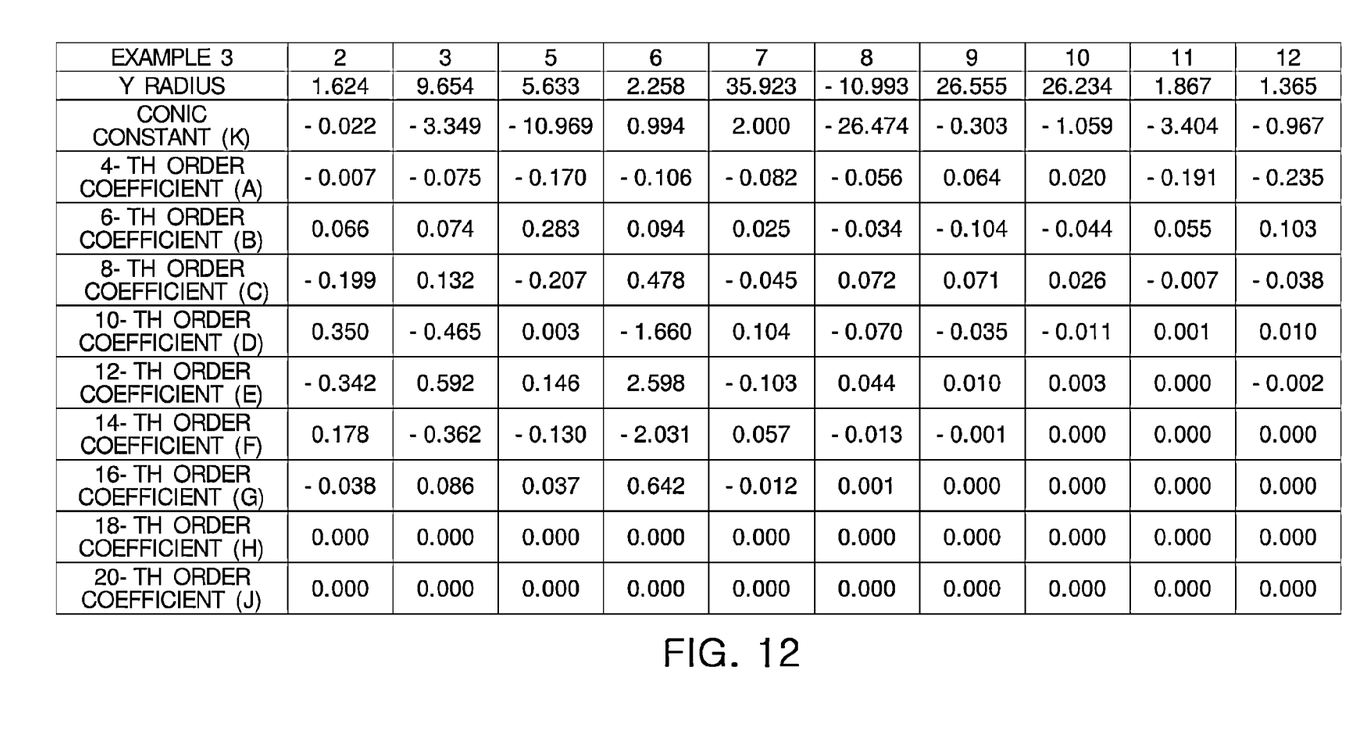
FIG. 12 is a table displaying aspherical surface coefficients of the lens module shown in FIG. 9.

FIG. 1 is a configuration diagram of a lens module according to a first exemplary embodiment of the present disclosure; FIG. 2 is a graph displaying aberration characteristics of the lens module shown in FIG. 1; FIG. 3 is a table displaying characteristics of lenses shown in FIG. 1; FIG. 4 is a table displaying aspherical surface coefficients of the lens module shown in FIG. 1; FIG. 5 is a configuration diagram of a lens module according to a second exemplary embodiment of the present disclosure; FIG. 6 is a graph displaying aberration characteristics of the lens module shown in FIG. 5; FIG. 7 is a table displaying characteristics of lenses shown in FIG. 5; FIG. 8 is a table displaying aspherical surface coefficients of the lens module shown in FIG. 5; FIG. 9 is a configuration diagram of a lens module according to another exemplary embodiment of the present disclosure; FIG. 10 is a graph displaying aberration characteristics of the lens module shown in FIG. 9; FIG. 11 is a table displaying characteristics of lenses shown in FIG. 9; and FIG. 12 is a table displaying aspherical surface coefficients of the lens module shown in FIG. 9.

A lens module according to the present disclosure may include an optical system including five lenses. In detail, the lens module may include a first lens, a second lens, a third lens, a fourth lens, and a fifth lens. However, the lens module is not limited to including only five lenses, but may further include other components if necessary. For example, the lens module may include a stop for controlling an amount of light admitted thereinto. In addition, the lens module may further include an infrared cut-off filter cutting off an infrared ray. Further, the lens module may further include an image sensor (that is, an imaging device) converting an image of a subject incident through the optical system into electrical signals. Further, the lens module may further include an interval maintaining member adjusting an interval between lenses.

The first to fifth lenses configuring the optical system may be formed of plastic. In addition, at least one of the first to fifth lenses may have an aspherical surface. Further, the first to fifth lenses may have at least one aspherical surface. For example, at least one of first and second surfaces of the first to fifth lenses may be aspherical.

In addition, the optical system including the first to fifth lenses may have F No. of 2.3 or less. In this case, the subject may be clearly photographed. For example, the lens module according to the present disclosure may clearly photograph an image of the subject even under a low illumination condition (for example, 100 lux or less).

The lens module according to an exemplary embodiment of the present disclosure may satisfy the following Conditional Expressions.

$$0.5 < f1/f < 1.0 \quad \text{[Conditional Expressions]}$$

Here, f is an overall focal length of the lens module, and f1 is a focal length of the first lens.

The above Conditional Expressions may be a numerical range for optimizing a ratio of the focal length of the first lens to the overall focal length. For example, in the case in which the lens module is outside of a lower limit value of the above Conditional Expressions, refractive power may be increased, such that it may be difficult to correct spherical aberrations, and in the case in which the lens module is outside of an upper limit value of the Conditional Expressions, the lens module may be advantageous for correcting aberration, but it may be difficult to miniaturize the lens module.

The lens module according to an exemplary embodiment of the present disclosure may satisfy the following Conditional Expressions.

$$V1-V2 > 25.0 \quad \text{[Conditional Expressions]}$$

Here, V1 is an abbe number of the first lens, and V2 is an abbe number of the second lens.

The above Conditional Expressions may be a condition for optimizing materials of the lenses. For example, the first lens and the second lens satisfying the above Conditional Expressions may significantly decrease chromatic aberration.

The lens module according to an exemplary embodiment of the present disclosure may satisfy the following Conditional Expressions.

$$-2.0 < f2/f < -1.0 \quad \text{[Conditional Expressions]}$$

Here, f is the overall focal length of the lens module, and f2 is a focal length of the second lens.

The above Conditional Expressions may be a numerical range for optimizing a ratio of the focal length of the second lens to the overall focal length. For example, in the case in which the second lens is outside of the numerical range of the above Conditional Expressions, negative refractive power of the second lens may become excessively high or low, such that it may be difficult to correct aberration.

The lens module according to an exemplary embodiment of the present disclosure may satisfy the following Conditional Expressions.

$$0.8 < OAL/f < 1.3 \quad \text{[Conditional Expressions]}$$

Here, f is the overall focal length of the lens module, and OAL is a distance from an object-side surface of the first lens to an image surface.

The above Conditional Expressions may be a numerical range for optimizing a ratio of the overall focal length to an overall length of the lens module. For example, in the case in which the lens module is outside of an upper limit value of the above Conditional Expressions, it may be difficult to miniaturize the lens module, and in the case in which the lens module is outside of a lower limit value of the above Conditional Expressions, it may be difficult to secure an effective field of view.

The lens module according to an exemplary embodiment of the present disclosure may satisfy the following Conditional Expressions.

$$f2/f3 < -0.25 \quad \text{[Conditional Expressions]}$$

Here, f2 is the focal length of the second lens, and f3 is a focal length of the third lens.

The above Conditional Expressions may be a condition for optimizing disposition of refractive power of the second lens and the third lens. For example, the second lens that is outside of a range of the above Conditional Expressions may have high negative refractive power to deteriorate aberration characteristics of the lens module.

The lens module according to an exemplary embodiment of the present disclosure may satisfy the following Conditional Expressions.

$$BFL/f > 0.2 \quad \text{[Conditional Expressions]}$$

Here, f is the overall focal length of the lens module, and BFL is a distance from an image-side surface of the fifth lens to the image surface.

The above Conditional Expressions may be a condition for improving convenience in manufacturing the lens module. For example, in the case in which the lens module is outside of a range of the above Conditional Expressions, it may be difficult to secure a distance from the fifth lens to the image surface, such that it may be difficult to actually manufacture the lens module.

The lens module according to an exemplary embodiment of the present disclosure may satisfy the following Conditional Expressions.

$$D12/f < 0.04 \quad \text{[Conditional Expressions]}$$

Here, f is the overall focal length of the lens module, and D12 is an air gap between the first lens and the second lens.

The above Conditional Expressions may be a condition for optimizing designs of the first lens and the second lens. For example, in the case in which the lens module is outside of the above Conditional Expressions, a longitudinal chromatic aberration improvement effect through the first lens and the second lens may be slight.

The lens module according to an exemplary embodiment of the present disclosure may satisfy the following Conditional Expressions.

$$r1/f > 0.3 \quad \text{[Conditional Expressions]}$$

Here, f is the overall focal length of the lens module, and r1 is a radius of curvature of the object-side surface of the first lens.

The above Conditional Expressions may be a condition for optimizing a design of the first lens. For example, the first lens that is outside of the above Conditional Expressions may have an excessively low radius of curvature, such that it may be difficult to manufacture the first lens, and the first lens may be sensitive to a tolerance.

The lens module according to an exemplary embodiment of the present disclosure may satisfy the following Conditional Expressions.

$$r8/f > 1.5 \quad \text{[Conditional Expressions]}$$

Here, f is the overall focal length of the lens module, and r8 is a radius of curvature of an image-side surface of the fourth lens.

The above Conditional Expressions may be a condition for optimizing a design of the fourth lens. For example, the fourth lens that is outside of the above Conditional Expressions may have an excessively low radius of curvature, such that it may be difficult to manufacture the fourth lens, and the fourth lens may be sensitive to a tolerance.

The lens module according to an exemplary embodiment of the present disclosure may satisfy the following Conditional Expressions.

$(EPD/2)/f1 > 0.2$     [Conditional Expressions]

Here, f1 is the focal length of the first lens, and EPD (entrance pupil diameter) is a size of a stop formed at the front of the lens module.

The above Conditional Expressions may be a condition for securing a sufficient amount of light of the lens module. For example, the lens module that is outside of the above Conditional Expressions may not secure the sufficient amount of light, such that it may be difficult to implement high resolution.

The lens module according to an exemplary embodiment of the present disclosure may satisfy the following Conditional Expressions.

$(r7-r8)/f > 0$     [Conditional Expressions]

Here, f is the overall focal length of the lens module, r7 is a radius of curvature of an object-side surface of the fourth lens, and r8 is the radius of curvature of the image-side surface of the fourth lens.

The above Conditional Expressions may be a condition for limiting refractive power of the fourth lens.

The lens module according to an exemplary embodiment of the present disclosure may satisfy the following Conditional Expressions.

$1.0 < r7/r8 < 1.6$     [Conditional Expressions]

Here, r7 is the radius of curvature of the object-side surface of the fourth lens, and r8 is the radius of curvature of the image-side surface of the fourth lens.

The above Conditional Expressions may be a condition for limiting a shape and the refractive power of the fourth lens.

Next, the first to fifth lenses configuring the optical system will be described.

The first lens may have refractive power. For example, the first lens may have positive refractive power. A first surface of the first lens may be convex, and a second surface thereof may be concave. For example, the first lens may have a meniscus shape in which it is convex toward the object. At least one of the first and second surfaces of the first lens may be aspherical. For example, both surfaces of the first lens may be aspherical. The first lens may be formed of a material having high light transmissivity and high workability. For example, the first lens may be formed of plastic. However, a material of the first lens is not limited to plastic. For example, the first lens may be formed of glass.

The second lens may have refractive power. For example, the second lens may have negative refractive power. In addition, the second lens may have refractive power weaker than that of the first lens. For example, the second lens may have a focal length longer than that of the first lens. A first surface of the second lens may be convex, and a second surface thereof may be concave. At least one of the first and second surfaces of the second lens may be aspherical. For example, both surfaces of the second lens may be aspherical. The second lens may be formed of a material having high light transmissivity and high workability. For example, the second lens may be formed of plastic. However, a material of the second lens is not limited to plastic. For example, the second lens may be formed of glass.

The third lens may have refractive power. For example, the third lens may have positive refractive power. Both surfaces of the third lens may be convex. At least one of the first and second surfaces of the third lens may be aspherical. For example, both surfaces of the third lens may be aspherical. The third lens may be formed of a material having high light transmissivity and high workability. For example, the third lens may be formed of plastic. However, a material of the third lens is not limited to plastic. For example, the third lens may be formed of glass.

The fourth lens may have refractive power. For example, the fourth lens may have negative refractive power. A first surface of the fourth lens may be convex, and a second surface thereof may be concave. For example, the fourth lens may have a meniscus shape in which it is convex toward the object or a plano-convex shape in which it is convex toward the object. At least one of the first and second surfaces of the fourth lens may be aspherical. For example, both surfaces of the fourth lens may be aspherical. The fourth lens may be formed of a material having high light transmissivity and high workability. For example, the fourth lens may be formed of plastic. However, a material of the fourth lens is not limited to plastic. For example, the fourth lens may be formed of glass.

The fifth lens may have refractive power. For example, the fifth lens may have negative refractive power. A first surface of the fifth lens may be convex, and a second surface thereof may be concave. For example, the fifth lens may have a meniscus shape in which it is convex toward the object. At least one of the first and second surfaces of the fifth lens may be aspherical. For example, both surfaces of the fifth lens may be aspherical. The fifth lens may be formed of a material having high degrees of light transmissivity and high workability. For example, the fifth lens may be formed of plastic. However, a material of the fifth lens is not limited to plastic. For example, the fifth lens may be formed of glass. In addition, the fifth lens may have one or more inflection point formed on at least one of the first and second surfaces thereof. For example, the fifth lens may have the inflection point formed on an image-side surface thereof.

In addition, the lens module configured as described above may improve aberration, which causes image quality deterioration. Further, the lens module configured as described above may improve resolution. Further, the lens module configured as described above may be easy for lightness and be advantageous for decreasing a manufacturing cost.

A lens module according to a first exemplary embodiment of the present disclosure will be described with reference to FIGS. 1 through 4.

A lens module 100 according to a first exemplary embodiment of the present disclosure may include an optical system including a first lens 10, a second lens 20, a third lens 30, a fourth lens 40, and a fifth lens 50, and may further include an infrared cut-off filter 60 and an image sensor 70. In addition, the lens module 100 according to a first exemplary embodiment of the present disclosure may have F No. of 2.1 and a field of view (FOV) of 73.5 degrees.

In a first exemplary embodiment of the present disclosure, the first lens 10 may have positive refractive power. In addition, a first surface of the first lens 10 may be convex, and a second surface thereof may be concave. The second lens 20 may have negative refractive power. In addition, a first surface of the second lens 20 may be convex, and a second surface thereof may be concave. The third lens 30 may have positive refractive power. In addition, both surfaces of the third lens 30 may be convex. The fourth lens 40 may have negative refractive power. In addition, a first surface of the fourth lens 40 may be convex, and a second surface thereof may be concave. The fifth lens 50 may have negative refractive power. In addition, a first surface of the fifth lens 50 may be convex, and a second surface thereof may be concave. Further, the fifth lens 50 may have an inflection point. For example, the fifth lens 50 may have the inflection point formed on the second surface thereof. Meanwhile, the fourth lens 40 may be disposed so as to be close to the fifth lens 50. For example, an air gap between the fourth lens 40 and the third lens 30 may be greater than an air gap between the fourth lens 40 and the fifth lens 50.

The lens module 100 according to a first exemplary embodiment of the present disclosure may include one or more stops ST. For example, the stop ST may be disposed between the second lens 20 and the third lens 30.

Meanwhile, the lens module 100 according to a first exemplary embodiment of the present disclosure may be designed so that the third lens 30 and the fourth lens 40 have refractive power similar to each other and the fifth lens 50 has refractive power higher than that of the third lens 30 and the fourth lens 40.

The lens module configured as described above may have aberration characteristics shown in FIG. 2 and may have lens characteristics shown in FIGS. 3 and 4. For reference, FIG. 3 is a table displaying radii of curvature, thicknesses and distances, refractive indices, abbe values of lenses, and FIG. 4 is a table displaying aspherical surface values of the lenses.

A lens module according to a second exemplary embodiment of the present disclosure will be described with reference to FIGS. 5 through 8.

A lens module 100 according to a second exemplary embodiment of the present disclosure may include an optical system including a first lens 10, a second lens 20, a third lens 30, a fourth lens 40, and a fifth lens 50, and may further include an infrared cut-off filter 60 and an image sensor 70. In addition, the lens module 100 according to a second exemplary embodiment of the present disclosure may have F No. of 2.1 and a FOV of 74.8 degrees.

In a second exemplary embodiment of the present disclosure, the first lens 10 may have positive refractive power. In addition, a first surface of the first lens 10 may be convex, and a second surface thereof may be concave. The second lens 20 may have negative refractive power. In addition, a first surface of the second lens 20 may be convex, and a second surface thereof may be concave. The third lens 30 may have positive refractive power. In addition, both surfaces of the third lens 30 may be convex. The fourth lens 40 may have negative refractive power. In addition, a first surface of the fourth lens 40 may be convex, and a second surface thereof may be concave. The fifth lens 50 may have negative refractive power. In addition, a first surface of the fifth lens 50 may be convex, and a second surface thereof may be concave. Further, the fifth lens 50 may have an inflection point. For example, the fifth lens 50 may have the inflection point formed on the second surface thereof. Meanwhile, the fourth lens 40 may be disposed so as to be close to the fifth lens 50. For example, an air gap between the fourth lens 40 and the third lens 30 may be higher than an air gap between the fourth lens 40 and the fifth lens 50.

The lens module 100 according to a second exemplary embodiment of the present disclosure may include one or more stops ST. For example, the stop ST may be disposed between the second lens 20 and the third lens 30.

Meanwhile, the lens module 100 according to a second exemplary embodiment of the present disclosure may be designed so that the fourth lens 40 has very low refractive power and the fifth lens 50 has refractive power lower than that of the third lens 30.

The lens module configured as described above may have aberration characteristics shown in FIG. 6 and may have lens characteristics shown in FIGS. 7 and 8. For reference, FIG. 7 is a table displaying radii of curvature, thicknesses and distances, refractive indices, abbe values of lenses, and FIG. 8 is a table displaying aspherical surface values of the lenses.

A lens module according to a third exemplary embodiment of the present disclosure will be described with reference to FIGS. 9 through 12.

A lens module 100 according to a third exemplary embodiment of the present disclosure may include an optical system including a first lens 10, a second lens 20, a third lens 30, a fourth lens 40, and a fifth lens 50, and may further include an infrared cut-off filter 60 and an image sensor 70. In addition, the lens module 100 according to a third exemplary embodiment of the present disclosure may have F No. of 2.1 and a FOV of 72.6 degrees.

In a third exemplary embodiment of the present disclosure, the first lens 10 may have positive refractive power. In addition, a first surface of the first lens 10 may be convex, and a second surface thereof may be concave. The second lens 20 may have negative refractive power. In addition, a first surface of the second lens 20 may be convex, and a second surface thereof may be concave. The third lens 30 may have positive refractive power. In addition, both surfaces of the third lens 30 may be convex. The fourth lens 40 may have negative refractive power. In addition, a first surface of the fourth lens 40 may be convex, and a second surface thereof may be concave. The fifth lens 50 may have negative refractive power. In addition, a first surface of the fifth lens 50 may be convex, and a second surface thereof may be concave. Further, the fifth lens 50 may have an inflection point. For example, the fifth lens 50 may have the inflection point formed on the second surface thereof. Meanwhile, the fourth lens 40 may be disposed so as to be close to the fifth lens 50. For example, an air gap between the fourth lens 40 and the third lens 30 may be higher than an air gap between the fourth lens 40 and the fifth lens 50.

The lens module 100 according to a third exemplary embodiment of the present disclosure may include one or more stops ST. For example, the stop ST may be disposed between the second lens 20 and the third lens 30.

Meanwhile, the lens module 100 according to a third exemplary embodiment of the present disclosure may be designed so that the fourth lens 40 has very low refractive power and the fifth lens 50 has refractive power lower than that of the third lens 30.

The lens module configured as described above may have aberration characteristics shown in FIG. 10 and may have lens characteristics shown in FIGS. 11 and 12. For reference, FIG. 11 is a table displaying radii of curvature, thicknesses and distances, refractive indices, abbe values of lenses, and FIG. 12 is a table displaying aspherical surface values of the lenses.

The above-mentioned exemplary embodiments have optical characteristics shown in Table 1. In addition, the above-mentioned exemplary embodiments satisfy all of Conditional Expressions shown on a left vertical axis of Table 2.

TABLE 1

| Remark | First Exemplary Embodiment | Second Exemplary Embodiment | Third Exemplary Embodiment |
|---|---|---|---|
| f | 3.80 | 3.78 | 4.55 |
| f1 | 2.95 | 3.13 | 3.47 |
| f2 | −5.31 | −6.04 | −6.04 |
| f3 | 14.36 | 13.93 | 15.47 |
| f4 | −9742.6 | −87180.9 | −12659.7 |
| f5 | −16.89 | −16.47 | −15.97 |
| FNO | 2.1 | 2.1 | 2.1 |
| FOV | 73.7 | 74.9 | 72.5 |

TABLE 2

| Conditional Equation | First Exemplary Embodiment | Second Exemplary Embodiment | Third Exemplary Embodiment |
|---|---|---|---|
| 0.5 < f1/f < 1.0 | 0.776 | 0.828 | 0.763 |
| v1 − v2 > 25.0 | 32.825 | 32.825 | 32.825 |
| −2.0 < f2/f < −1.0 | −1.397 | −1.599 | −1.327 |
| 0.8 < OAL/f < 1.3 | 1.161 | 1.170 | 1.158 |
| f2/f3 > −0.25 | −0.370 | −0.434 | −0.390 |
| BFL/f > 0.2 | 0.276 | 0.275 | 0.256 |
| D12/f < 0.04 | 0.026 | 0.028 | 0.025 |
| r1/f > 0.3 | 0.358 | 0.369 | 0.357 |
| r8/f > 1.5 | 37.903 | 4.780 | 5.766 |
| EPD/2/f1 > 0.2 | 0.309 | 0.291 | 0.314 |
| (r7 − r8)/f > 0 | 0.940 | 0.050 | 0.070 |
| 1.0 < r7/r8 < 1.8 | 1.025 | 1.011 | 1.012 |

As set forth above, according to exemplary embodiments of the present disclosure, high resolution may be implemented.

While exemplary embodiments have been shown and described above, it will be apparent to those skilled in the art that modifications and variations could be made without departing from the spirit and scope of the present disclosure as defined by the appended claims.

What is claimed is:

1. A lens module comprising:
   a first lens having positive refractive power;
   a second lens having refractive power, an image-side surface thereof being concave;
   a third lens having positive refractive power of which an object-side surface is convex;
   a fourth lens having negative refractive power, an object-side surface thereof being convex; and
   a fifth lens having negative refractive power and having one or more inflection point formed on at least one of an object-side surface and an image-side surface thereof
   wherein the first, second, third, fourth and fifth lenses are disposed in a sequential order from the first lens to the fifth lens.

2. The lens module of claim 1, wherein the second lens has negative refractive power.

3. The lens module of claim 1, wherein an object-side surface of the first lens is convex, and an image-side surface thereof is concave.

4. The lens module of claim 1, wherein an object-side surface of the second lens is convex.

5. The lens module of claim 1, wherein an image-side surface of the third lens is convex.

6. The lens module of claim 1, wherein the object-side surface of the fifth lens is convex, and the image-side surface thereof is concave.

7. The lens module of claim 1, wherein it satisfies the following Conditional Expressions:

$$0.5 < f1/f < 1.0 \quad \text{[Conditional Expressions]}$$

where f is an overall focal length of the lens module, and f1 is a focal length of the first lens.

8. The lens module of claim 1, wherein it satisfies the following Conditional Expressions:

$$V1 - V2 > 25.0 \quad \text{[Conditional Expressions]}$$

where V1 is an abbe number of the first lens, and V2 is an abbe number of the second lens.

9. The lens module of claim 1, wherein it satisfies the following Conditional Expressions:

$$-2.0 < f2/f < -1.0 \quad \text{[Conditional Expressions]}$$

where f is an overall focal length of the lens module, and f2 is a focal length of the second lens.

10. The lens module of claim 1, wherein it satisfies the following Conditional Expressions:

$$0.8 < OAL/f < 1.3 \quad \text{[Conditional Expressions]}$$

where f is an overall focal length of the lens module, and OAL is a distance from an object-side surface of the first lens to an image surface.

11. The lens module of claim 1, wherein it satisfies the following Conditional Expressions:

$$f2/f3 < -0.25 \quad \text{[Conditional Expressions]}$$

where f2 is a focal length of the second lens, and f3 is a focal length of the third lens.

12. The lens module of claim 1, wherein it satisfies the following Conditional Expressions:

$$BFL/f > 0.2 \quad \text{[Conditional Expressions]}$$

where f is an overall focal length of the lens module, and BFL is a distance from the image-side surface of the fifth lens to an image surface.

13. The lens module of claim 1, wherein it satisfies the following Conditional Expressions:

$$D12/f < 0.04 \quad \text{[Conditional Expressions]}$$

where f is an overall focal length of the lens module, and D12 is an air gap between the first lens and the second lens.

14. The lens module of claim 1, wherein it satisfies the following Conditional Expressions:

$$r1/f > 0.3 \quad \text{[Conditional Expressions]}$$

where f is an overall focal length of the lens module, and r1 is a radius of curvature of an object-side surface of the first lens.

15. The lens module of claim 1, wherein it satisfies the following Conditional Expressions:

$$r8/f > 1.5 \quad \text{[Conditional Expressions]}$$

where f is an overall focal length of the lens module, and r8 is a radius of curvature of an image-side surface of the fourth lens.

16. The lens module of claim 1, wherein it satisfies the following Conditional Expressions:

$$(EPD/2)/f1 > 0.2 \quad \text{[Conditional Expressions]}$$

where f1 is a focal length of the first lens, and EPD (entrance pupil diameter) is a size of a stop formed at the front of the lens module.

17. The lens module of claim 1, wherein it satisfies the following Conditional Expressions:

$$(r7 - r8)/f > 0 \quad \text{[Conditional Expressions]}$$

where f is an overall focal length of the lens module, r7 is a radius of curvature of the object-side surface of the fourth lens, and r8 is a radius of curvature of an image-side surface of the fourth lens.

18. The lens module of claim 1, wherein F No is 2.3 or less.

19. A lens module comprising:
   a first lens having positive refractive power;
   a second lens having refractive power;
   a third lens having positive refractive power of which an object-side surface is convex;
   a fourth lens having refractive power, an image-side surface thereof being concave; and a fifth lens having negative power and having one or more inflection point formed on at least one of an object-side surface and an image-side surface thereof, wherein the lens module satisfies the following Conditional Expressions:

$1.0 < r7/r8 < 1.6$      [Conditional Expressions]

where r7 is a radius of curvature of an object-side surface of the fourth lens, and r8 is a radius of curvature of the image-side surface of the fourth lens.

20. The lens module of claim 19, wherein the second lens has negative refractive power.

21. The lens module of claim 19, wherein an object-side surface of the first lens is convex, and an image-side surface thereof is concave.

22. The lens module of claim 19, wherein an object-side surface of the second lens is convex, and an image-side surface thereof is concave.

23. The lens module of claim 19, wherein an image-side surface of the third lens is convex.

24. The lens module of claim 19, wherein the object-side surface of the fourth lens is convex.

25. The lens module of claim 19, wherein the object-side surface of the fifth lens is convex, and the image-side surface thereof is concave.

* * * * *